(12) United States Patent
Shimizu et al.

(10) Patent No.: US 8,347,918 B2
(45) Date of Patent: Jan. 8, 2013

(54) SOLENOID VALVE APPARATUS

(75) Inventors: Tetsuya Shimizu, Anjo (JP); Kazuhiko Kato, Kariya (JP); Noriomi Fujii, Anjo (JP); Kazunori Ishikawa, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 412 days.

(21) Appl. No.: 12/662,715

(22) Filed: Apr. 29, 2010

(65) Prior Publication Data

US 2010/0313980 A1    Dec. 16, 2010

(30) Foreign Application Priority Data

Jun. 11, 2009   (JP) ................................. 2009-140122

(51) Int. Cl.
*F16K 31/06* (2006.01)
(52) U.S. Cl. ............. 137/625.65; 137/596.16; 477/127; 477/163; 477/164; 417/222.2; 417/417
(58) Field of Classification Search ............ 137/625.65, 137/625.64, 596.16, 596.25; 477/127–164; 417/222.2, 417
See application file for complete search history.

(56) References Cited

U.S. PATENT DOCUMENTS

| | | | | |
|---|---|---|---|---|
| 4,875,501 A | * | 10/1989 | Ichihashi et al. | 137/625.64 |
| 5,186,204 A | * | 2/1993 | Oka et al. | 137/238 |
| 6,408,883 B2 | * | 6/2002 | Motoki et al. | 137/625.64 |
| 7,282,005 B2 | * | 10/2007 | Shimizu et al. | 475/127 |
| 7,412,989 B2 | * | 8/2008 | Segi et al. | 137/625.64 |
| 7,468,647 B2 | * | 12/2008 | Ishibashi et al. | 335/281 |
| 2008/0308757 A1 | | 12/2008 | Nakai et al. | |

FOREIGN PATENT DOCUMENTS

| | | |
|---|---|---|
| CN | 1592048 A | 3/2005 |
| CN | 101166926 A | 4/2008 |
| JP | A-2002-310326 | 10/2002 |
| JP | A-2003-120842 | 4/2003 |
| JP | A-2004-176895 | 6/2004 |
| JP | A-2007-126974 | 5/2007 |
| JP | A-2008-180303 | 8/2008 |
| JP | A-2010-121768 | 6/2010 |
| WO | WO 2008/155929 A1 | 12/2008 |

OTHER PUBLICATIONS

International Search Report mailed Jul. 6, 2010 in International Application No. PCT/JP2010/058158 (with translation).
Sep. 4, 2012 Office Action issued in Japanese Patent Application No. 2009-140122 (English Translation only).
Oct. 15, 2012 Search Report issued in Chinese Patent Application No. 2010800099337.

* cited by examiner

*Primary Examiner* — John K Fristoe, Jr.
*Assistant Examiner* — Umashankar Venkatesan
(74) *Attorney, Agent, or Firm* — Oliff & Berridge, PLC (57) ABSTRACT

A solenoid valve apparatus includes a solenoid valve and a switching device that switches between a first state in which the working fluid in the pump chamber is discharged when the solenoid valve functions as a regulator valve and a second state in which discharge of the working fluid from the pump chamber is prohibited when the solenoid valve functions as the electromagnetic pump.

7 Claims, 4 Drawing Sheets

FIG. 3A WHEN FUNCTIONING AS A REGULATOR VALVE

FIG. 3B WHEN FUNCTIONING AS A PUMP

FIG. 4

SOLENOID VALVE APPARATUS

INCORPORATION BY REFERENCE

The disclosure of Japanese Patent Application No. 2009-140122 filed on Jun. 11, 2009 including the specification, drawings and abstract is incorporated herein by reference in its entirety.

BACKGROUND

The present invention relates to a solenoid valve apparatus.

A solenoid valve apparatus of this type has been proposed in the related art. The proposed solenoid valve apparatus includes: a solenoid valve that is disposed in a hydraulic circuit for switching a friction engagement device (a clutch) of an automatic transmission installed in a vehicle ON and OFF in order to regulate an oil pressure input from a hydraulic pump driven by power from an engine and output the regulated oil pressure to the clutch; a selector valve that is interposed in an oil passage connecting the solenoid valve to the clutch in order to connect and disconnect the oil passage selectively; and an electromagnetic pump that is connected to the oil passage connecting the selector valve to the clutch via a check valve in order to supply working oil to the clutch in accordance with repetitive excitation and non-excitation of an electromagnetic coil (see Japanese Patent Application Publication 2008-180303, for example).

SUMMARY

Hence, various valves and an electromagnetic pump are disposed as the solenoid valve apparatus, but since installation space in the vehicle is limited, the apparatus is preferably made as small as possible. When reducing the size of the apparatus, measures must be taken to ensure that the respective functions of the valves and the electromagnetic pump can be exhibited sufficiently.

A main object of a solenoid valve apparatus according to the present invention is to achieve a reduction in the overall size of the apparatus by integrating a pump function with a pressure regulation function in a manner which ensures that the respective functions can be exhibited sufficiently.

To achieve the main object described above, the solenoid valve apparatus according to the present invention employs the following means.

The solenoid valve apparatus according to a first aspect of the present invention includes: a solenoid valve having a spool that is constituted by a shaft-shaped member inserted slidably into a cylindrical hollow portion and formed so as to define a pressure regulating chamber for regulating and outputting a fluid pressure supplied from a fluid pressure source and a feedback chamber into which the regulated output pressure is led, and an electromagnetic portion that drives the spool by using an electromagnetic force, the solenoid valve being formed with a pump chamber defined adjacent to the feedback chamber by the hollow portion and the spool so as to function as an electromagnetic pump that suctions and discharges a working fluid in accordance with generation and cancellation of the electromagnetic force from the electromagnetic portion; and a switching device that switches between a first state in which the working fluid in the pump chamber is discharged when the solenoid valve functions as a regulator valve and a second state in which discharge of the working fluid from the pump chamber is prohibited when the solenoid valve functions as the electromagnetic pump.

The solenoid valve apparatus according to the first aspect of the present invention includes: the solenoid valve formed with the pump chamber defined adjacent to the feedback chamber by the hollow portion and the spool so as to function as an electromagnetic pump that suctions and discharges the working fluid in accordance with generation and cancellation of the electromagnetic force from the electromagnetic portion; and the switching device that switches between the first state in which the working fluid in the pump chamber is discharged when the solenoid valve functions as a regulator valve and the second state in which discharge of the working fluid in the pump chamber is prohibited when the solenoid valve functions as the electromagnetic pump. Hence, the overall size of the apparatus can be reduced in comparison with an apparatus in which the regulator valve and the electromagnetic pump are provided separately. Further, when the solenoid valve functions as the regulator valve, the working fluid in the pump chamber is discharged, and therefore a situation in which working fluid remaining in the pump chamber adversely affects the pressure regulation precision can be avoided. Moreover, during pressure regulation, the working oil leaks from the comparatively high-pressure feedback chamber into the adjacent pump chamber, and therefore air can be prevented from infiltrating the pump chamber. Hence, the solenoid valve can start to function as the electromagnetic pump quickly when switched from the pressure regulation function to the pump function. As a result, the pump function and the pressure regulation function can be integrated without damaging either function, enabling a reduction in the overall size of the apparatus.

In the solenoid valve apparatus according to a second aspect of the present invention, the spool may be formed in a shaft shape having a step on one end by a first sliding portion formed on an end portion and a second sliding portion formed with a larger outer diameter than the first sliding portion, and the pump chamber may be formed as a space surrounded by a first inner wall formed in the hollow portion with an inner diameter along which the first sliding portion can slide, a second inner wall formed in the hollow portion with an inner diameter along which the second sliding portion can slide, and an end surface of the second sliding portion inserted into the second inner wall, and may be separated from the feedback chamber by the second inner wall and the second sliding portion. Thus, the pump function and the pressure regulation function can be integrated by a simple constitution. In the solenoid valve apparatus according to a third aspect of the present invention, a volume of an interior of the pump chamber may be varied in accordance with a reciprocating motion of the spool corresponding to generation and cancellation of the electromagnetic force from the electromagnetic portion such that when a negative pressure is generated in the pump chamber due to variation in the volume, the working fluid is suctioned, and when a positive pressure is generated in the pump chamber, the suctioned working fluid is discharged. The solenoid valve apparatus according to a fourth aspect of the present invention may further include: an intake check valve that allows the working fluid to flow from a fluid storage portion to the pump chamber; and a discharge check valve that allows the working fluid to flow from the pump chamber to an operation subject. In the solenoid valve apparatus, the pump chamber may be formed with a single inflow/outflow port connected to the intake check valve and the discharge check valve via a flow passage. Thus, the size of the solenoid valve can be reduced in comparison with a constitution in which the intake check valve and the discharge check valve are built into the solenoid valve. In the solenoid valve apparatus according to a fifth aspect of the present invention, the discharge check valve may be built into the switching device and the intake check valve may be built into the switching device. Thus, the overall size of the apparatus can be reduced even further.

Furthermore, in the solenoid valve apparatus according to a sixth aspect of the present invention, the switching device may be a switch valve into which the fluid pressure from the fluid pressure source is input as a signal pressure, and the switch valve switches to the first state when the signal pressure is input and switches to the second state when the signal pressure is not input. Thus, the switching device can perform a switching operation through a simple constitution, enabling a further reduction in the overall size of the apparatus.

DETAILED DESCRIPTION OF EMBODIMENTS

Next, the present invention will be described using a preferred embodiment.

Figure 1:
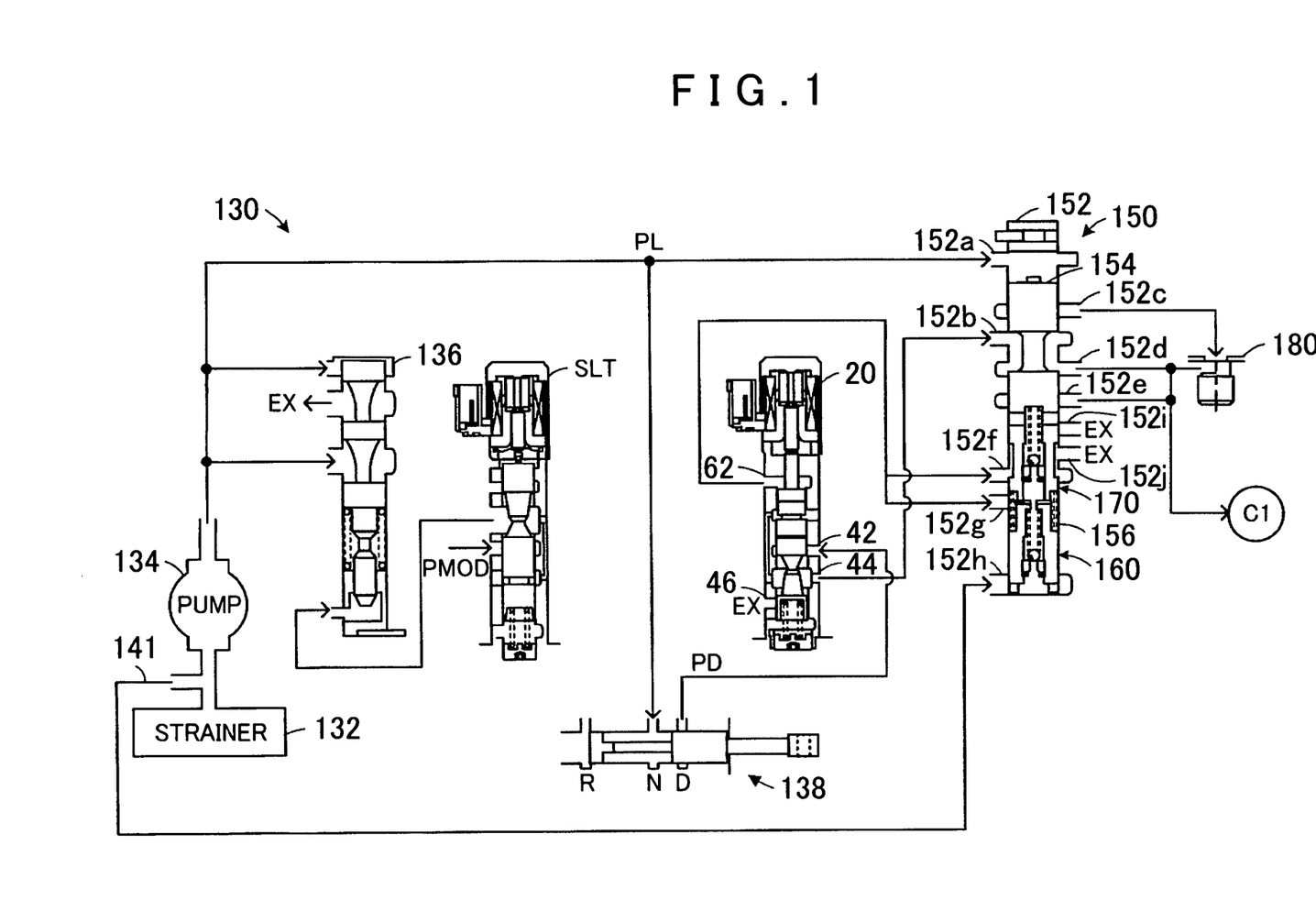
FIG. 1 is a schematic diagram showing the constitution of a hydraulic circuit 130 including a solenoid valve apparatus serving as an embodiment of the present invention.
Figure 2:
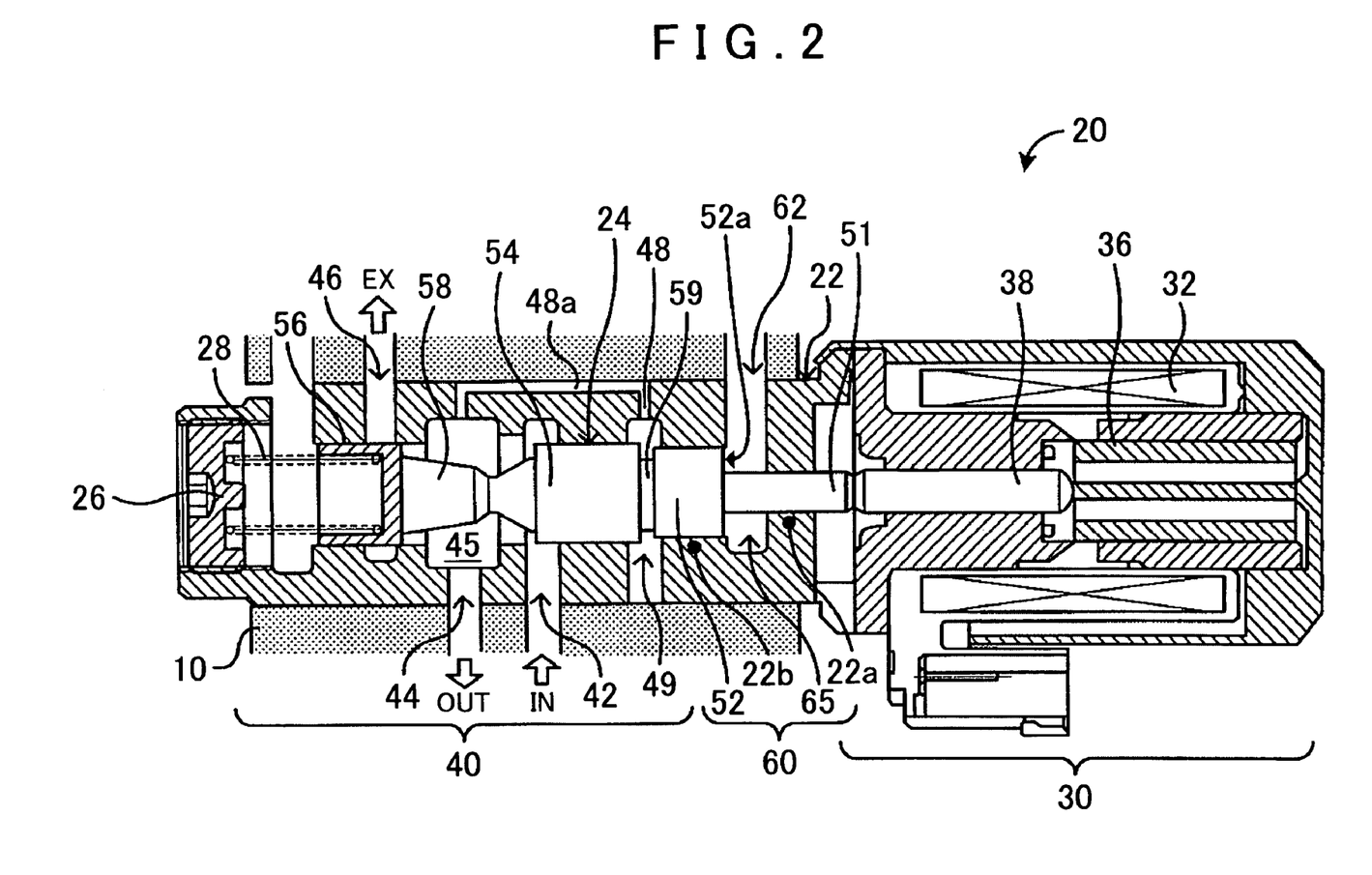
FIG. 2 is a schematic diagram showing the constitution of a solenoid valve 20.

FIG. 1 is a schematic diagram showing the constitution of a hydraulic circuit 130 including a solenoid valve apparatus serving as an embodiment of the present invention, and FIG. 2 is a schematic diagram showing the constitution of a solenoid valve 20. The hydraulic circuit 130 is constituted so as to perform hydraulic control of a clutch or a brake incorporated into an automatic transmission installed in a vehicle, and includes a mechanical oil pump 134 that pumps working oil via a strainer 132 in accordance with power from an engine, not shown in the drawing, a regulator valve 136 that regulates the working oil pumped from the mechanical oil pump 134 to generate a line pressure PL, a linear solenoid SLT that regulates a modulator pressure PMOD generated from the line pressure PL via a modulator valve, not shown in the drawing, and drives the regulator valve 136 by outputting the modulator pressure PMOD as a signal pressure, a solenoid valve 20 that functions as a regulator valve that receives the line pressure PL via a manual valve 138 and then regulates and outputs the input line pressure PL, and that also functions as an electromagnetic pump that suctions and discharges working oil from an intake oil passage 141 between the strainer 132 and the mechanical oil pump 134, a switch valve 150 that switches between a state in which the solenoid valve 20 is caused to function as a regulator valve such that oil pressure from the regulator valve is supplied to a clutch C1 and a state in which the solenoid valve 20 is caused to function as an electromagnetic pump such that oil pressure from the electromagnetic pump is supplied to the clutch C1, and so on.

As shown in FIG. 2, the solenoid valve 20 includes a solenoid portion 30 that generates a suction force by means of a magnetic circuit formed when a current is applied to a coil 32 and drives a plunger 36 and a shaft 38 contacting the plunger 36, a regulator valve portion 40 that is driven by the solenoid portion 30 to function as a regulator valve, and a pump portion 60 that is also driven by the solenoid portion 30 to function as an electromagnetic pump.

The regulator valve portion 40 and the pump portion 60 include, as common members, a substantially cylindrical sleeve 22 that is incorporated into a valve body 10 such that one end thereof is attached to the solenoid portion 30, a spool 24 that is inserted into an interior space of the sleeve 22 such that one end thereof contacts a tip end of the shaft 38 of the solenoid portion 30, an end plate 26 that is screwed to the other end of the sleeve 22, and a spring 28 that is provided between the end plate 26 and the other end of the spool 24 to bias the spool 24 in the direction of the solenoid portion 30 side.

An input port 42 that receives working oil, an output port 44 that outputs the input working oil, a drain port 46 that drains the input working oil, and a feedback port 48 that receives the working oil output through the output port 44 via an oil passage 48a formed by an inner surface of the valve body 10 and an outer surface of the sleeve 22 in order to apply a feedback force to the spool 24 are formed in the sleeve 22 as opening portions to a region forming the regulator valve portion 40. Further, a pump chamber port 62 through which working oil can flow in and flow out is formed in the sleeve 22 as an opening portion to a region forming the pump portion 60.

The spool 24 is formed as a shaft-shaped member inserted into the interior of the sleeve 22, and includes a shaft 51 formed on one end thereof to be capable of sliding along an inner wall 22a of the sleeve 22, which is formed with a slightly larger inner diameter than an outer diameter of the shaft 51, a columnar land 52 formed with a larger outer diameter than the shaft 51 to be capable of sliding along an inner wall 22b of the sleeve 22, which is formed with a slightly larger inner diameter than the outer diameter of the land 52, a columnar land 54 formed with a slightly larger outer diameter than the land 52 to be capable of sliding along the inner wall of the sleeve 22, a hollow cylindrical land 56 that functions as a spring bearing for receiving the spring 28 and is capable of sliding along the inner wall of the sleeve 22, a communication portion 58 that connects the land 54 to the land 56, is formed in a tapered shape such that an outer diameter thereof is smaller than the outer diameters of the lands 54, 56 and the outer diameter thereof decreases steadily toward a central portion from the respective lands 54, 56, and enables mutual communication between the input port 42, the output port 44, and the drain port 46, and a connecting portion 59 that connects the land 54 to the land 52 having a smaller outer diameter than the land 54. In the spool 24, a pressure regulating chamber 45 is formed by the communication portion 58, the lands 54, 56, and the inner wall of the sleeve 22, a feedback chamber 49 is formed by the communication portion 59, the lands 52, 54, and the inner wall of the sleeve 22, and a pump chamber 65 is formed adjacent to the feedback chamber 49 by an end surface 52a of the land 52 and the inner walls 22a, 22b of the sleeve 22. The pump chamber 65 is separated from the feedback chamber 49 by the inner wall 22b of the sleeve 22 and the land 52. Here, the spool 24 is formed in a stepped shape having a diameter difference between the shaft 51 and the land 52, and therefore, when the spool 24 moves such that the land 52 shifts to the pump chamber 65 side, a volume of the pump chamber 65 decreases in proportion to a surface area and a movement amount of the end surface 52a of the land 52, whereby a positive pressure is generated. When the land 52 shifts to the feedback chamber 49 side, the volume of the pump chamber 65 increases in proportion to the surface area and movement amount of the end surface 52a, whereby a negative pressure is generated. Further, the land 52 is inserted to be capable of sliding along the inner wall 22b, and therefore a slight gap exists between the land 52 and the inner wall 22*b*. Hence, when an internal pressure of the feedback chamber 49 is high, working oil leaks from the feedback chamber 49 to the pump chamber 65 through the gap.

An operation of the solenoid valve 20 according to this embodiment, constituted as described above, and in particular an operation performed by the solenoid valve 20 when functioning as a regulator valve, will now be described. First, when energization of the coil 32 is OFF, the spool 24 is moved to the solenoid portion 30 side by a biasing force of the spring 28, and therefore the input port 42 communicates with the output port 44 via the communication portion 58 and the drain port 46 is blocked by the land 56. Accordingly, a maximum oil pressure is output. When energization of the coil 32 is switched ON, the plunger 36 is suctioned by a suction force corresponding to the magnitude of the current applied to the coil 32, whereby the shaft 38 is pushed out such that the spool 24 moves to the end plate 26 side. As a result, the input port 42, output port 44, and drain port 46 enter a mutually communicative state in which a part of the working oil input through the input port 42 is output to the output port 44 and the remainder is output to the drain port 46. At this time, working oil corresponding to an output pressure of the output port 44 is supplied to the feedback chamber 49 through the feedback port 48, and therefore the internal pressure of the feedback chamber 49 increases. Further, a feedback force corresponding to the output pressure acts on the spool 24 in the direction of the end plate 26 side. As a result, the spool 24 stops in a position where a thrust (suction force) of the plunger 36, a spring force of the spring 28, and the feedback force are precisely counterbalanced. When energization of the coil 32 reaches a maximum, the spool 24 moves farthest to the end plate 26 side, whereby the input port 42 is blocked by the land 54 and the output port 44 communicates with the drain port 46 via the communication portion 58. Accordingly, no oil pressure is output. Hence, it can be seen that when energization of the coil 32 is OFF, the input port 42 communicates with the output port 44 and the drain port 46 is blocked. Therefore the solenoid valve 20 according to this embodiment functions as a normally open solenoid valve. Note that an operation performed by the solenoid valve 20 when functioning as an electromagnetic pump will be described below.

Figure 3A:
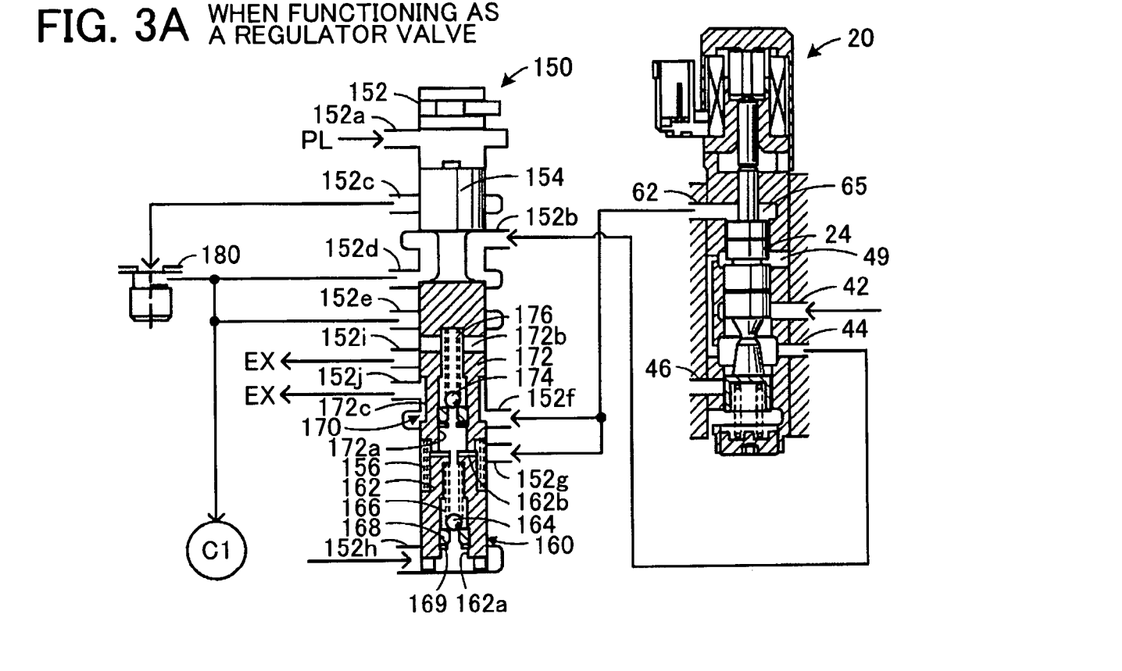
FIGS. 3A and 3B are schematic diagrams showing a constitution centering on the solenoid valve 20 and a switch valve 150.
Figure 3B:
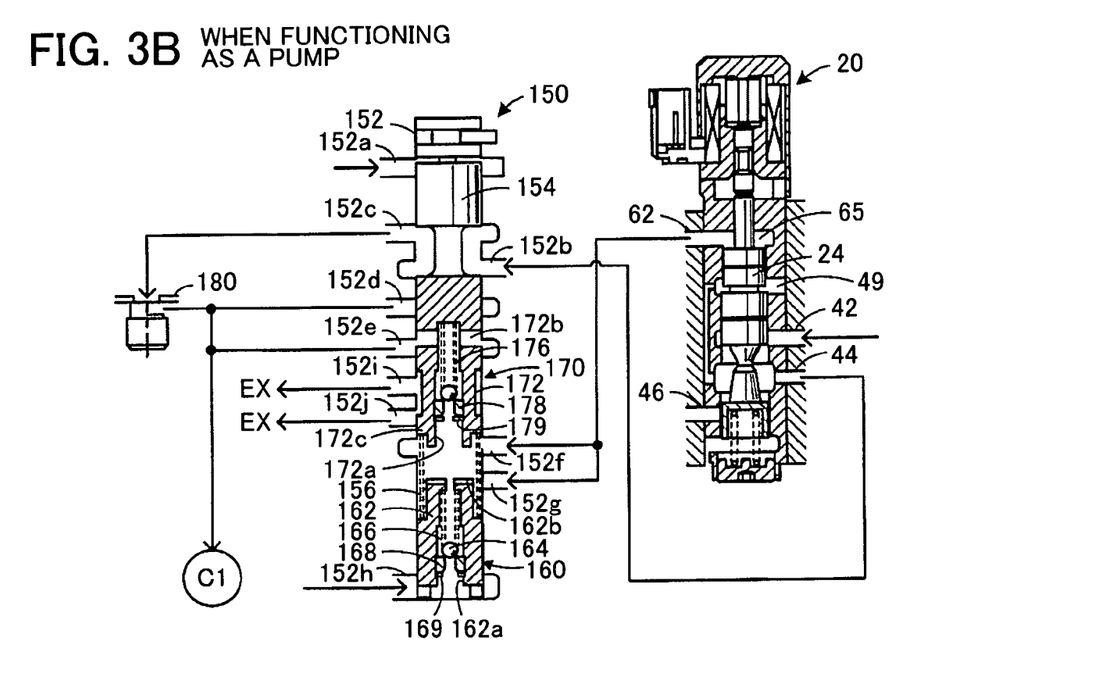

The switch valve 150 is constituted by a sleeve 152 formed with a signal pressure input port 152*a* for inputting the line pressure PL as a signal pressure, an input port 152*b* connected to the output port 44 of the solenoid valve 20, an output port 152*c* connected to the clutch C1 via a check valve 180, two output ports 152*d*, 152*e* connected to the clutch C1 without passing through the check valve 180, an input port 152*f* and an output port 152*g* connected to the pump chamber port 62 of the pump chamber 65 of the solenoid valve 20, an input port 152*h* connected to the intake oil passage 141 between the mechanical oil pump 134 and the strainer 132, and two drain ports 152*i*, 152*j*, a spool 154 that slides within the sleeve 152 and is integrated with a discharge check valve 170, a spring 156 that biases the spool 154 in an axial direction, an intake check valve 160 built into the sleeve 152, and the discharge check valve 170, which is built into the sleeve 152. FIGS. 3A and 3B show a schematic constitution centering on the solenoid valve 20 and the switch valve 150.

As shown in FIGS. 3A and 3B, the intake check valve 160 is constituted by a hollow cylindrical main body 162 formed with a central hole 162*a* having a step between a large diameter part and a small diameter part in an axial center thereof, a spring 166 inserted from the large diameter side such that the step of the central hole 162*a* serves as a spring bearing, a ball 164 inserted in the central hole 162*a* from the large diameter side after inserting the spring 166, a hollow cylindrical ball bearing 168 inserted into the central hole 162*a* to receive the ball 164, and a snap ring 169 for fixing the ball bearing 168 to the main body 162. Meanwhile, the discharge check valve 170 is constituted by a main body 172 that is molded integrally with the spool 154, formed with a recessed central hole 172*a* in an axial center thereof, and formed with a through hole 172*b* that penetrates the central hole 172*a* in a radial direction, a spring 176 inserted into the central hole 172*a* such that a bottom of the central hole 172*a* serves as a spring bearing, a ball 174 inserted into the central hole 172*a* after inserting the spring 176, a hollow cylindrical ball bearing 178 that is inserted into the central hole 172*a* to receive the ball 174, and a snap ring 179 for fixing the ball bearing 178 to the main body 172. Further, the main body 172 of the discharge check valve 170 is formed with a reduced diameter portion 172*c* in which a part of an outer diameter of the discharge check valve 170 is reduced.

Here, the solenoid valve 20 and the switch valve 150 installed with the intake check valve 160 and the discharge check valve 170 correspond to the solenoid valve apparatus according to this embodiment.

Next, an operation of the solenoid valve apparatus according to this embodiment having the above constitution will be described. First, a case in which the solenoid valve 20 functions as a regulator valve will be described. As shown in FIG. 3A, when the line pressure PL is input into the signal pressure input port 152*a* of the switch valve 150, the spool 154 moves downward in the drawing as the spring 156 is caused to contract by the line pressure PL, whereby the input port 152*b* communicates with the output port 152*d* and the input port 152*f* communicates with the drain port 152*j* via the reduced diameter portion 172*c*. As a result, the solenoid valve 20 is caused to function as a regulator valve such that oil pressure from the output port 44 can be applied to the clutch C1. At this time, working oil remaining in the pump chamber 65 and an oil passage connected thereto is drained via the input port 152*f*, the reduced diameter portion 172*c*, and the drain port 152*j* in that order, and therefore does not adversely affect a pressure regulation precision of the solenoid valve 20. Further, a communicating hole 162*b* is formed in a part of the main body 162 of the intake check valve 160 that contacts the main body 172 of the discharge check valve 170, and therefore working oil remaining in a space between the intake check valve 160 and the discharge check valve 170 is drained via the output port 152*g*, the input port 152*f*, the reduced diameter portion 172*c*, and the drain port 152*j* in that order.

Next, a case in which the solenoid valve 20 functions as an electromagnetic pump will be described. As shown in FIG. 3B, when the line pressure PL is input into the signal pressure input port 152*a* of the switch valve 150, the spool 154 moves upward in the drawing as the spring 156 is caused to expand by its biasing force, whereby communication between the input port 152*b* and the output port 152*d* is blocked, the input port 152*h* communicates with the output port 152*g* via the intake check valve 160 (the central hole 162*a*), the input port 152*f* and the output port 152*e* communicate via the discharge check valve 170 (the central hole 172*a* and the through hole 172*b*), and communication between the input port 152*f* and the drain ports 152*i*, 152*j* is blocked. In the solenoid valve 20, when the solenoid portion 30 is driven from a state in which driving of the solenoid portion 30 is canceled such that the spool 22 is pushed to the solenoid portion 30 side by the spring 28, the spool 22 is pushed outward, and therefore negative pressure is generated in the pump chamber 65, causing the intake check valve 160 to open and the discharge check valve 170 to close, whereby working oil is led into the pump chamber 65 via the input port 152*h* of the switch valve 150, the intake check valve 160, and the output port 152*g* in that order. When driving of the solenoid portion 30 is subsequently canceled, the spool 22 is pushed back by the spring 28, and therefore positive pressure is generated in the pump chamber 65, causing the intake check valve 160 to close and the discharge check valve 170 to open, whereby the working oil led into the pump chamber 65 is supplied to the clutch C1 via the input port 152*f* of the switch valve 150, the intake check valve 170, and the output port 152*e* in that order.

When the solenoid valve functions as a regulator valve, the working oil in the pump chamber 65 or the oil passage connected thereto is drained into the atmosphere, but when the solenoid valve subsequently functions as an electromagnetic pump, air may infiltrate, making it impossible to pressurize the working oil sufficiently, and as a result, the pump performance may deteriorate. In the solenoid valve 20 according to this embodiment, however, the pump chamber 65 is formed adjacent to the feedback chamber 49, and therefore, when the solenoid valve 20 functions as a regulator valve, working oil leaks from the high-pressure feedback chamber 49 into the pump chamber 65. Using this working oil leakage, a flow of working oil from the pump chamber 65 to the drain is generated, and therefore the working oil can be drained smoothly and air can be prevented from infiltrating. Hence, when the solenoid valve 20 is switched from a state of functioning as a regulator valve to a state of functioning as an electromagnetic pump, a favorable pump performance can be exhibited quickly. The pump chamber 65 is formed adjacent to the feedback chamber 49 for the following reason.

An example of a case in which the hydraulic circuit 130 including the solenoid valve apparatus according to the present invention is applied to a hydraulic circuit of an automatic transmission installed in a vehicle will now be described. The vehicle envisaged in this embodiment is a vehicle in which an operative engine is stopped automatically when a vehicle speed reaches a value of 0 and an automatic stopping condition such as brake ON is established and the automatically stopped engine is automatically started when an automatic start condition such as brake OFF is established. Further, the clutch C1 is assumed to be a clutch which forms a startup (low speed travel) gear ratio when engaged and to which oil pressure is applied during automatic stoppage so that the vehicle can be started quickly when the automatically stopped engine is automatically started. First, during low speed travel before the engine is automatically stopped, the mechanical oil pump 34 is driven by power from the engine such that the line pressure PL is input into the signal pressure input port 152*a* of the switch valve 150, and therefore the switch valve 150 connects the output port 44 of the pressure regulating chamber 45 of the solenoid valve 20 to the clutch C1 and connects the pump chamber 65 of the solenoid valve 20 to the drain port 152*j*. Furthermore, since the solenoid valve 20 is functioning as a regulator valve in order to supply oil pressure to the clutch C1, working oil leaks from the feedback chamber 49 into the pump chamber 65 such that the working oil in the pump chamber 65 is drained smoothly and air is prevented from infiltrating. When the automatic stopping condition is established such that the engine is automatically stopped, the mechanical oil pump 34 stops together with the engine. As a result, the line pressure PL escapes such that the switch valve 150 blocks communication between the output port 44 of the pressure regulating chamber 45 and the clutch C1, connects the intake oil passage 141 to the pump chamber 65 via the intake check valve 160, and connects the pump chamber 65 to the clutch C1 via the discharge check valve 170. Further, during automatic stoppage, oil pressure acts on the clutch C1, and therefore, when the engine is automatically stopped, the solenoid valve 20 is switched from the state of functioning as a regulator valve to the state of functioning as an electromagnetic pump. As described above, prior to automatic stoppage the solenoid valve 20 is caused to function as a regulator valve such that working oil leaks into the pump chamber 65 from the feedback chamber 49 and air is prevented from infiltrating the pump chamber 65 or the oil passage connected thereto. Hence, when the solenoid valve 20 starts to function as a pump, a favorable pump performance can be exhibited quickly. Therefore, when the engine is automatically stopped, oil pressure can be applied to the clutch C1 smoothly.

In the solenoid valve apparatus according to the embodiment described above, the solenoid valve 20 includes the pressure regulation portion 40 that functions as a regulator valve and the pump portion 60 that functions as an electromagnetic pump, the pump chamber 65 of the pump portion 60 is formed adjacent to the feedback chamber 49 of the pressure regulation portion 40 by the sleeve 22 and the spool 24 that slides within the sleeve 22, and during pressure regulation, the switch valve 150 connects the pump chamber port 62 of the pump chamber 65 to the drain port 152*j*. Therefore, using working oil leakage from the feedback chamber 49, which increases in pressure during pressure regulation, into the pump chamber 65, working oil can be drained from the pump chamber 65 smoothly and air can be prevented from infiltrating the pump chamber 65. Hence, when the solenoid valve 20 is switched from the state in which it functions as a regulator valve to the state in which it functions as an electromagnetic pump, a favorable pump performance can be exhibited quickly. Furthermore, a situation in which working oil remaining in the pump chamber 65 adversely affects the pressure regulation precision can be prevented. As a result, the pump function and the pressure regulation function can be integrated in the solenoid valve 20 in a manner which ensures that the respective functions can be exhibited sufficiently, enabling a reduction in the overall size of the apparatus.

Figure 4:
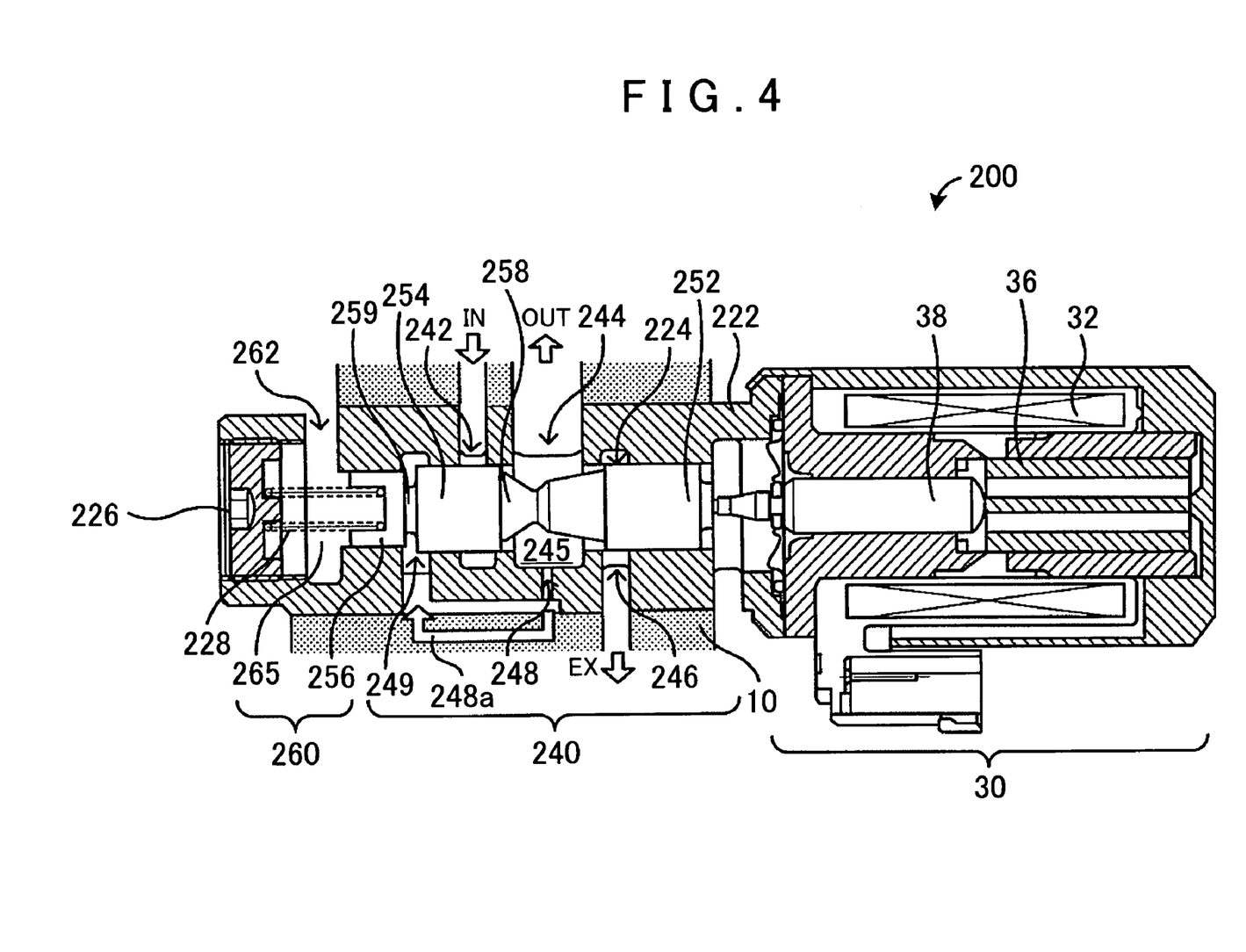
FIG. 4 is a schematic diagram showing the constitution of a solenoid valve 200 according to a modified example.

In the solenoid valve apparatus according to this embodiment, the pump function is integrated into the solenoid valve 20 as a so-called normally open linear solenoid. However, the pump function may be integrated as a so-called normally closed linear solenoid, as shown by a solenoid valve 200 according to a modified example in FIG. 4. The solenoid valve 200 according to this modified example includes a regulator valve portion 240 that functions as a regulator valve and a pump portion 260 that functions as an electromagnetic pump. Note that the solenoid portion 30 is constituted identically to that of the solenoid valve 20. An input port 242, an output port 244, a drain port 246, and a feedback port 248 are formed in a sleeve 222 in a region of the regulator valve portion 240, and a pump chamber port 262 is formed in the sleeve 222 a region of the pump portion 260. Although not shown in the drawing, the output port 244 is connected to the input port 152*b* of the switch valve 150 and the pump chamber port 262 is connected to the input port 152*f* and the output port 152*g* of the switch valve 150, similarly to the solenoid valve 20 according to the embodiment. A feedback chamber 249 is formed in the spool 224 by a communication portion 259, lands 254, 256, and an inner wall of the sleeve 222, and a pump chamber 265 is formed adjacent to the feedback chamber 249 by the land 256, the inner wall of the sleeve 222, and an end plate 226. In the regulator valve portion 240, when energization of the coil 32 is OFF, the spool 224 is moved to the solenoid portion 30 side by a biasing force of a spring 228, and therefore the input port 242 is blocked and the output port 244 communicates with the drain port 246, whereby no oil pressure is output. When energization of the coil 32 is switched ON, the plunger 36 is suctioned by a suction force corresponding to the applied current, whereby the spool 24 moves to the end plate 26 side. As a result, the input port 242, output port 244 and drain port 246 enter a mutually communicative state in which a part of the working oil input through the input port 242 is output to the output port 244 and the remainder is output to the drain port 246. At this time, working oil corresponding to an output pressure of the output port 244 is supplied to the feedback chamber 249 such that the pressure of the feedback chamber 249 increases. Likewise in the solenoid valve 200 according to the modified example, the pump chamber 265 is formed adjacent to the feedback chamber 249, and therefore, when the solenoid valve 200 is caused to function as a regulator valve, working oil leaks from the high-pressure feedback chamber 249 into the pump chamber 265. Therefore, similar effects to those of the embodiment can be exhibited. Note that in the pump portion 260, when the solenoid portion 30 is driven, the spool 222 is pushed outward such that positive pressure is generated in the pump chamber 265, and therefore the working oil in the pump chamber 265 can be discharged. When driving of the solenoid portion 30 is then canceled, the spool 222 is pushed back by the spring 228 such that negative pressure is generated in the pump chamber 265, and therefore working oil can be suctioned into the pump chamber 265.

In the solenoid valve apparatus according to this embodiment, the spool 24 of the solenoid valve 20 is inserted into the sleeve 22. However, the spool 24 may be inserted directly into the cylindrical space formed in the valve body 10 without passing through the sleeve 22.

In the solenoid valve apparatus according to this embodiment, the intake check valve 160 and the discharge check valve 170 are built into the switch valve 150, but one or both of the intake check valve and the discharge check valve may be incorporated into the valve body 10 on the exterior of the switch valve. Further, the switch valve 150 is constituted by a valve that connects and disconnects the output port 44 of the solenoid valve 20 and the clutch C1 or the like, but may be constituted by a valve that simply connects and disconnects the pump chamber port 62 of the solenoid valve 20 and the drain port 152j.

In the solenoid valve apparatus according to this embodiment, oil pressure is supplied to the same clutch C1 when the solenoid valve 20 functions as a regulator valve and when the solenoid valve 20 functions as an electromagnetic pump. However, oil pressure may be supplied to different clutches respectively when the solenoid valve 20 functions as a regulator valve and when the solenoid valve 20 functions as an electromagnetic pump.

In the solenoid valve apparatus according to this embodiment, the switch valve 150 is driven using the line pressure PL but may be driven using the modulator pressure PMOD, which is obtained by reducing the line pressure PL via a modulator valve, not shown in the drawings. Alternatively, the switch valve 150 may be driven by supplying the line pressure PL or the modulator pressure PMOD to the switch valve 150 via a solenoid valve.

The solenoid valve apparatus according to this embodiment is used for hydraulic control of a clutch incorporated into an automatic transmission but is not limited thereto, and may be used in fluid pressure control of any operating mechanism that is operated by fluid pressure.

Correspondence relationships between the main elements of the embodiment and the main elements of the inventions described in the Disclosure of the Invention will now be described. In the embodiment, the spool 24 inserted into the sleeve 22 corresponds to the "spool", the solenoid portion 30 corresponds to the "electromagnetic portion", the pump chamber 65 corresponds to the "pump chamber", the solenoid valve 20 corresponds to the "solenoid valve", and the switch valve 50 corresponds to the "switching device". Further, the shaft 51 corresponds to the "first sliding portion", the land 52 corresponds to the "second sliding portion", the inner wall 22a corresponds to the "first inner wall", the inner wall 22b corresponds to the "second inner wall", the intake check valve 160 corresponds to the "intake check valve", the discharge check valve 170 corresponds to the "discharge check valve", and the pump chamber port 62 corresponds to the "inflow/outflow port".

The embodiment of the present invention has been described above, but the present invention is not limited to this embodiment and may be implemented in various embodiments within a scope that does not depart from the spirit of the present invention.

This application claims priority on the basis of Japanese Patent Application No. 2009-140122, filed on Jun. 11, 2009, the entire contents of which are incorporated into this specification by reference.

The present invention may be used in the solenoid valve manufacturing industry and so on.

What is claimed is:

1. A solenoid valve apparatus comprising:
    a solenoid valve having a spool that is constituted by a shaft-shaped member inserted slidably into a cylindrical hollow portion and formed so as to define a pressure regulating chamber for regulating and outputting a fluid pressure supplied from a fluid pressure source and a feedback chamber into which the regulated output pressure is led, and an electromagnetic portion that drives the spool by using an electromagnetic force, the solenoid valve being formed with a pump chamber defined adjacent to the feedback chamber by the hollow portion and the spool so as to function as an electromagnetic pump that suctions and discharges a working fluid in accordance with generation and cancellation of the electromagnetic force from the electromagnetic portion; and
    a switching device that switches between a first state in which the working fluid in the pump chamber is discharged when the solenoid valve functions as a regulator valve and a second state in which discharge of the working fluid from the pump chamber is prohibited when the solenoid valve functions as the electromagnetic pump.

2. The solenoid valve apparatus according to claim 1, wherein the spool is formed in a shaft shape having a step on one end by a first sliding portion formed on an end portion and a second sliding portion formed with a larger outer diameter than the first sliding portion, and
    the pump chamber is formed as a space surrounded by a first inner wall formed in the hollow portion with an inner diameter along which the first sliding portion can slide, a second inner wall formed in the hollow portion with an inner diameter along which the second sliding portion can slide, and an end surface of the second sliding portion inserted into the second inner wall, and is separated from the feedback chamber by the second inner wall and the second sliding portion.

3. The solenoid valve apparatus according to claim 2, wherein a volume of an interior of the pump chamber varies in accordance with a reciprocating motion of the spool corresponding to generation and cancellation of the electromagnetic force from the electromagnetic portion such that, when a negative pressure is generated in the pump chamber due to variation in the volume, the working fluid is suctioned, and when a positive pressure is generated in the pump chamber, the suctioned working fluid is discharged.

4. The solenoid valve apparatus according to claim 3, further comprising:
   an intake check valve that allows the working fluid to flow from a fluid storage portion to the pump chamber; and
   a discharge check valve that allows the working fluid to flow from the pump chamber to an operation subject,
   wherein the pump chamber is formed with a single inflow/outflow port connected to the intake check valve and the discharge check valve via a flow passage.

5. The solenoid valve apparatus according to claim 4, wherein the discharge check valve is built into the switching device.

6. The solenoid valve apparatus according to claim 5, wherein the intake check valve is built into the switching device.

7. The solenoid valve apparatus according to claim 1, wherein
   the switching device is a switch valve into which the fluid pressure from the fluid pressure source is input as a signal pressure, and
   the switch valve switches to the first state when the signal pressure is input and switches to the second state when the signal pressure is not input.

* * * * *